United States Patent
Le Pannerer et al.

(10) Patent No.: US 11,686,274 B2
(45) Date of Patent: Jun. 27, 2023

(54) CONFLUENCE STRUCTURE OF A PRIMARY STREAM AND A SECONDARY STREAM IN A BYPASS TURBINE ENGINE

(71) Applicant: SAFRAN AIRCRAFT ENGINES, Paris (FR)

(72) Inventors: Brice Marie Yves Emile Le Pannerer, Moissy-Cramayel (FR); Jean-François Cabre, Moissy-Cramayel (FR); Nicolas Camille Claude Curlier, Moissy-Cramayel (FR); Lucas Arthur Pflieger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/616,456

(22) PCT Filed: May 28, 2020

(86) PCT No.: PCT/FR2020/050897
§ 371 (c)(1),
(2) Date: Dec. 3, 2021

(87) PCT Pub. No.: WO2020/245525
PCT Pub. Date: Dec. 10, 2020

(65) Prior Publication Data
US 2022/0252023 A1    Aug. 11, 2022

(30) Foreign Application Priority Data
Jun. 6, 2019 (FR) ...................... 19 06046

(51) Int. Cl.
*F02K 3/075*    (2006.01)
*F02K 3/06*    (2006.01)
*F02K 3/10*    (2006.01)

(52) U.S. Cl.
CPC ............... *F02K 3/075* (2013.01); *F02K 3/06* (2013.01); *F02K 3/10* (2013.01);
(Continued)

(58) Field of Classification Search
CPC ............... F02K 3/06; F02K 3/075; F02K 3/10
See application file for complete search history.

(56) References Cited

U.S. PATENT DOCUMENTS 4,072,008 A    2/1978    Kenworth
4,175,384 A    11/1979   Wagenknecht et al.
(Continued)

FOREIGN PATENT DOCUMENTS

FR    2 296 769 A1    7/1976
FR    2 399 547 A1    3/1979

OTHER PUBLICATIONS

International Search Report dated Oct. 2, 2020 in PCT/FR2020/050897 filed May 28, 2020, citing documents AA-AB and AO-AP therein, 2 pages.
(Continued)

*Primary Examiner* — Lorne E Meade
(74) *Attorney, Agent, or Firm* — Oblon, McClelland, Maier & Neustadt, L.L.P.

(57) ABSTRACT

A confluence structure of an aircraft bypass turbine engine which includes a confluence plate with a downstream end supported by a portion that is movable in the direction of the axis by a control mechanism which can optionally be adjusted in flight. A mobile portion of a sleeve delimiting the secondary stream on the outside, and an inner projection of the outer casing can also slide axially in certain embodiments. This provides a wide range of options for modifying the gas dilution and operating conditions of the engine.

15 Claims, 6 Drawing Sheets

(52) U.S. Cl.
CPC .... *F05D 2220/323* (2013.01); *F05D 2240/14* (2013.01); *F05D 2260/52* (2013.01); *F05D 2260/606* (2013.01)

(56) References Cited

U.S. PATENT DOCUMENTS

| | | | | |
|---|---|---|---|---|
| 5,287,697 | A * | 2/1994 | Johnson | F02K 3/075 |
| | | | | 60/226.3 |
| 6,021,637 | A * | 2/2000 | Scavo | F02K 1/30 |
| | | | | 239/265.17 |
| 8,938,943 | B2 * | 1/2015 | Erickson | F02K 1/08 |
| | | | | 60/226.3 |
| 9,926,883 | B1 * | 3/2018 | Ress | F02K 1/08 |
| 10,233,867 | B2 * | 3/2019 | Lovett | F02K 1/15 |

OTHER PUBLICATIONS

Preliminary French Search Report dated Feb. 18, 2020 in French Patent Application No. 1906046 filed Jun. 6, 2019, citing documents AA and AO-AP therein, 2 pages, (with Translation of Categories).

* cited by examiner

CONFLUENCE STRUCTURE OF A PRIMARY STREAM AND A SECONDARY STREAM IN A BYPASS TURBINE ENGINE

BACKGROUND OF THE INVENTION

Field of the Invention

The subject of the invention is a confluence structure of a primary stream and a secondary stream, in a bypass turbine engine.

Description of the Related Art

The search for an optimum thermodynamic cycle is a constant problem for turbine engines, notably aircraft engines, and the solution of which varies according to the considered flight regime. It is traditionally sought to find a compromise between the requirements of the different flight regimes in designing the turbine engine. It is also necessary to underline that the inevitable margins of uncertainty between the theoretical conditions and the real operating conditions of the machine may further move, for each flight regime, the real operation away from the optimal operation.

In the particular case of bypass engines comprising a confluence of the primary and secondary streams in the downstream direction of the flow, a parameter intervening in the characteristics of the cycle is the bypass ratio of the engine, which can be defined as the ratio of the flow rate of the secondary flow over the flow rate of the primary flow downstream of the low pressure compressor; yet this rate notably depends on the conditions of the confluence of the two streams downstream of the low pressure turbine, and in particular their sections at this place, which governs the local gas pressures of the two flows and affects the air intake flow rates at the inlet of the streams. The confluence takes place at a trailing edge (downstream end) of a circular shell, called confluence plate, which separates the primary stream from the secondary stream downstream of the low pressure turbine, and the streams join together just after. The bypass ratio thus depends on the shape of this confluence plate and on its position with respect to other concentric shells, which define the sections of the streams at the place of confluence.

The subject matter of the invention is to be able to adjust the bypass ratio of the turbine engine according to needs, optionally in flight. The fundamental means used is the possibility of varying the position of the end of the confluence plate in the axial direction of the turbine engine, using a means for adjusting a part of the confluence plate which is made moveable with respect to the other constituents of the surrounding structure.

The documents U.S. Pat. No. 4,072,008 A, FR 2399547 A1 and FR 2296769 A1 describe various layouts where the bypass ratio or the pressure at the confluence of two streams of a turbine engine may be adjusted by modifying the confluence conditions, for example the opening section of one of the streams.

BRIEF SUMMARY OF THE INVENTION

In a general form, the invention thus relates to a confluence structure of a primary stream and a secondary stream, surrounding the primary stream of an aircraft engine, a confluence plate separating the primary stream and the secondary stream and having a revolution shape and a downstream end (according to a direction of flow of gas in the primary stream and the secondary stream in an axial direction of the engine), the secondary stream being limited externally in a radial direction of the engine by an outer casing, characterised in that the confluence plate has a moving part, adjustably sliding in the axial direction with respect to a complementary part, fixed with respect to the outer casing, of said confluence plate, the moving part comprising the downstream end, the primary stream and the secondary stream joining together only downstream of said downstream end.

By displacing the end of the confluence plate, the sections of at least one of the streams may be modified in a chosen manner, in an environment where the other walls that delimit them may have variable radiuses, and notably be conical.

A more complex design of the invention involves the existence of another revolution part, called sleeve surrounded by the casing while delimiting an annular outer channel therewith, in which circulates an outer gas flow withdrawn from the secondary stream and protecting the outer casing from hot gases downstream of the confluence. This sleeve notably extends downstream of the downstream end of the confluence plate and has a spout (an upstream end, according to said direction of flow of gases). It is unitary and fixed with respect to the outer casing in usual designs, when it exists; but it may also be provided, according to the invention, with a continuation, here called shell, comprising a part fixed in the outer casing and a moving part on the fixed part, in an analogous manner to that which is provided at the confluence head: the moving part comprises the upstream end, and slides adjustably in the axial direction with respect to the fixed part of said shell. This arrangement will make it possible to vary, according to the configuration of the surrounding structure, the inlet geometry of the annular outer channel and the part of the flow rate of the secondary stream that enters therein, and above all the complementary part, which contributes to the dilution of the gases of the primary stream.

This effect is particularly sensitive if the casing comprises a projection projecting radially inwards in the secondary stream, and the moving part of the shell is moveable in positions where the upstream end is upstream of the projection, and in positions where the upstream end is downstream of the projection, since the inlet section of the annular outer channel then varies very considerably.

In a preferred embodiment, enabling easy controls of the movement of the confluence plate or the moving part of the shell, one at least of these moving parts is displaced by adjustment devices extending outside of the outer casing: these devices may then be controlled by mechanisms outside of the turbine engine, relatively easy to design and to arrange.

Such adjustment devices may consist in pivoting pins, radially bearing on the outer casing, provided with cams bearing on the edges of the confluence plate or the shell.

If this is necessary, the pivoting pins may traverse liners of one at least of the fixed part of the confluence plate and the fixed part of the shell, while being adjusted therein by ball joint linkages.

Such an arrangement guarantees good isostaticity of the mounting of the fixed parts concerned, while making it possible to maintain their concentricity with the axis of the turbine engine, but also to expand freely by the sliding of the ball joints in the liners. And the ball joints on the pins make it possible to minimise leakages at the places where they traverse the shells.

The concentricity of the moving part with respect to the fixed part, for at least one of the confluence plate and the shell, may for its part be easily maintained by springs compressed between the fixed part and the moving part in the radial direction, but enabling their sliding, or by mechanisms comprising for example wheels, rollers, or lubricated surfaces. A fine adjustment over a long centring, between the two fixed and moving parts may nevertheless suffice, with optionally the addition of a solid lubricant, a coating for example.

In a particularly preferred embodiment, because enabling an easy transition and without loss of efficiency of the flow between the different positions of the moving parts, the fixed part (of at least one of the confluence plate and the shell) is connected to the corresponding moving part by at least one curved plate comprising an end tangential to the fixed part, an end tangential to the moving part, and an intermediate part curved and tangential to each of the ends; the intermediate part and at least one of the ends, which is sliding either on the fixed part or on the moving part, being divided into angular sectors by slots of axial direction.

According to an important construction in practice, one at least of the moving part of the confluence plate and the moving part of the shell is traversed by radial extension elements of the structure, with oblong piercings being able to be covered by airtight seals. Such radial elements may comprise afterburn fuel injector pencils.

BRIEF DESCRIPTION OF THE SEVERAL VIEWS OF THE DRAWINGS

The different aspects, characteristics and advantages of the invention will now be described in greater detail by means of the following figures, which illustrate certain preferred embodiments thereof, given for purely illustrative purposes.

DETAILED DESCRIPTION OF THE INVENTION

Figure 1:
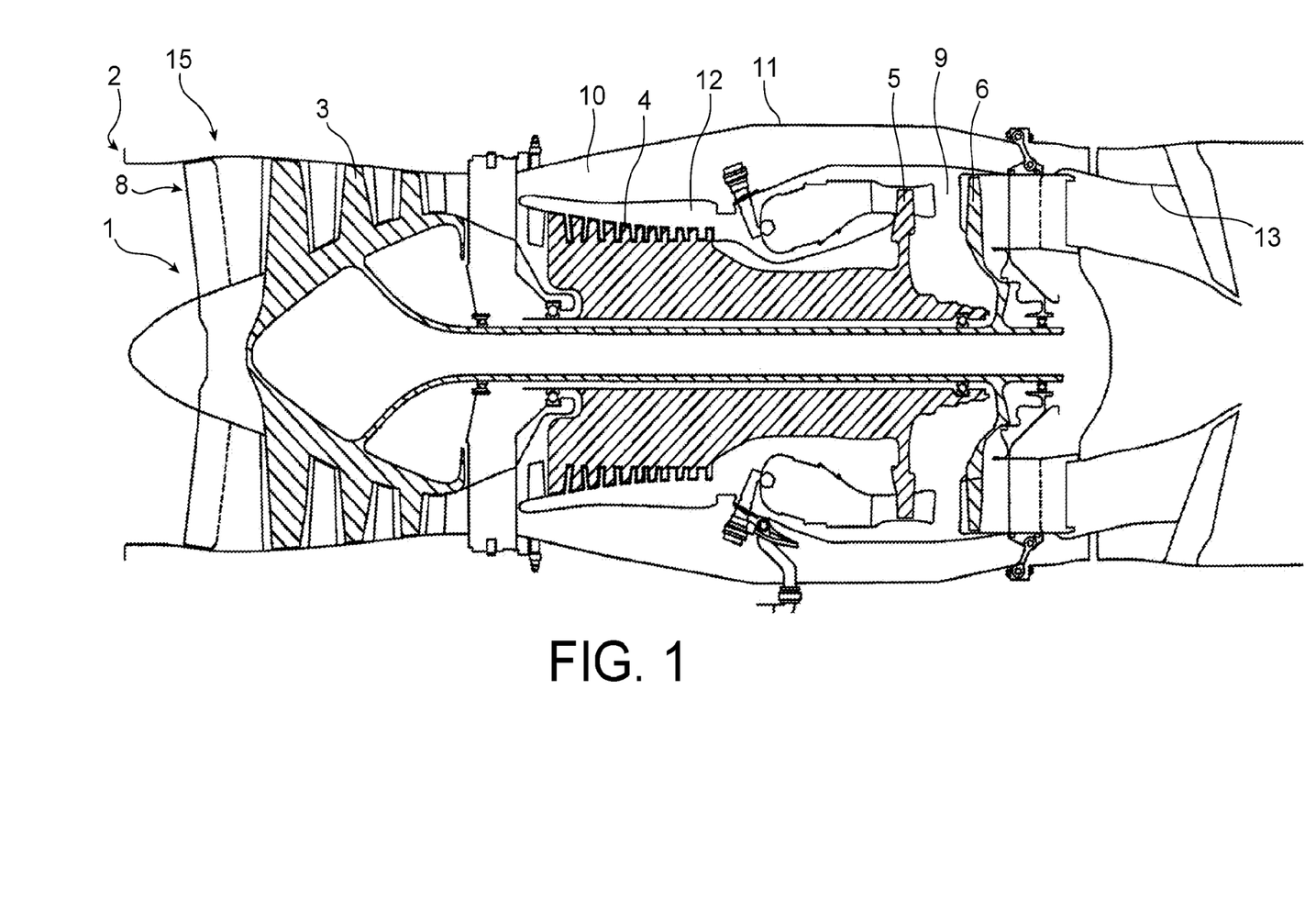
FIG. 1 is a general view of a bypass turbine engine.
Figure 2:
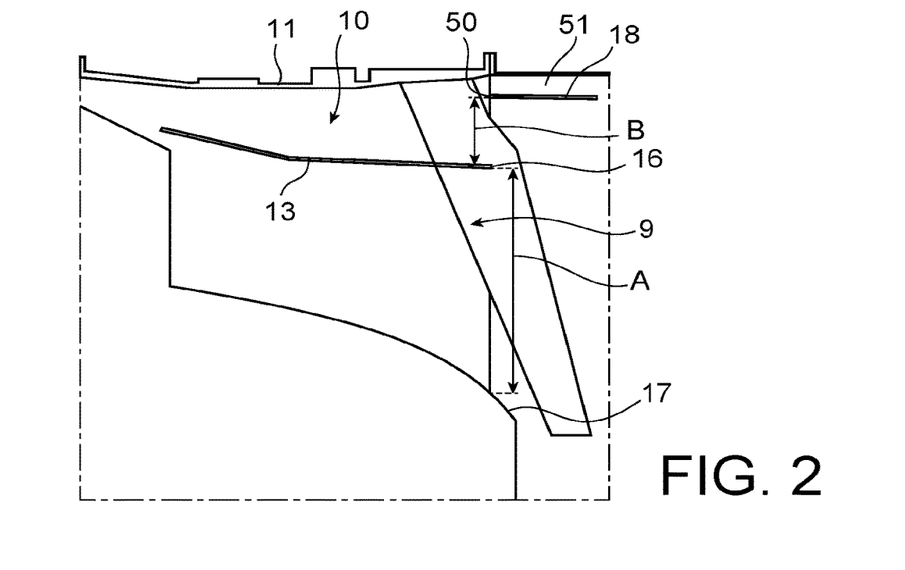
FIG. 2 is an enlargement of the confluence zone.

FIGS. 1 and 2 represent a turbojet engine which conventionally comprises a rotor 1, rotating around a central axis X, and a stator 2 arranged around the rotor 1. The rotor 1 and the stator 2 share the blades of a low pressure compressor 3, a high pressure compressor 4, a high pressure turbine 5 and a low pressure turbine 6 which succeed one another along the axis X. The space between the rotor 1 and the stator 2 is occupied by a stream 8, unitary upstream, and which divides into a concentric primary stream 9 and secondary stream 10 downstream of the low pressure compressor 3. The unitary part 8 of the stream and the secondary stream 10 are surrounded by an outer casing 11. The primary stream 9 and the secondary stream 10 are separated from each other by an intermediate casing 12, of which the downstream part—in this description, "upstream" and "downstream" refer to the direction of flow of gases with respect to the central axis 1—is a confluence plate 13. The blades of the high pressure compressor 4 and the turbines 5 and 6 are present in the primary stream 9, as well as a combustion chamber 14. And the turbojet engine may comprise a fan 15 upstream of the low pressure compressor 3, the blades of which extend in the unitary portion 8 of the stream.

FIG. 2 shows that the confluence plate 13 is the only structure separating the streams 9 and 10 downstream, and that it thus also serves to delimit them. The streams 9 and 10 join together downstream of a downstream end, or trailing edge 16 of the confluence plate 13. The primary stream 9 is further delimited at its radially inner edge by a cone 17 of the rotor 1, tapering in the downstream direction; the secondary stream 10 is delimited at its radially outer edge by the outer casing 11, here called diffusion casing; another revolution part inside the outer casing 11, called sleeve 56, extends however in front of the section of the secondary stream 10 downstream of a spout 50 (upstream end): it delimits an annular outer channel or under sleeve channel 51, which intercepts a portion of flow rate of the secondary stream 10 and withdraws it at the confluence and the dilution of the gases of the primary stream 9. The air traversing the under sleeve channel 51 serves to protect the outer casing 11 from the heat of the combustion gases downstream of the confluence. The spout 50 here extends, upstream of the trailing edge 16. The bypass ratio and the thrust of the turbine engine then notably depend on the ratio of the sections of the primary stream 9 and the secondary stream 10 at the place of confluence, which is a function of the differences in radiuses A and B between the cone 17 and the confluence plate 13 on the one hand, the confluence plate 13 and the sleeve 56 on the other hand, which determine the gas pressures in the streams and the flow rate passing into the under sleeve channel 51.

Figure 3:
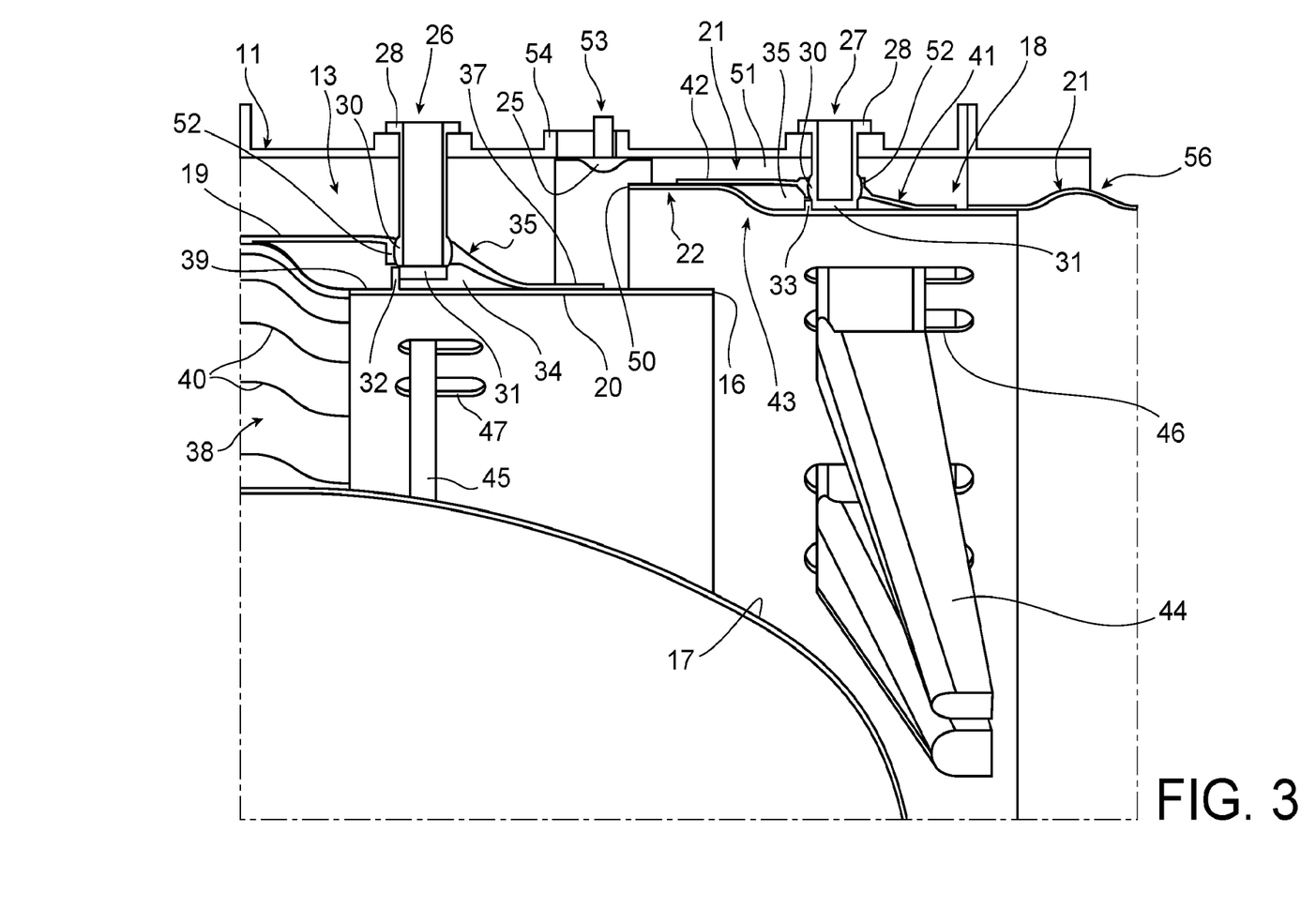
FIG. 3 illustrates the structural characteristics of the invention in the confluence zone.
Figure 4:
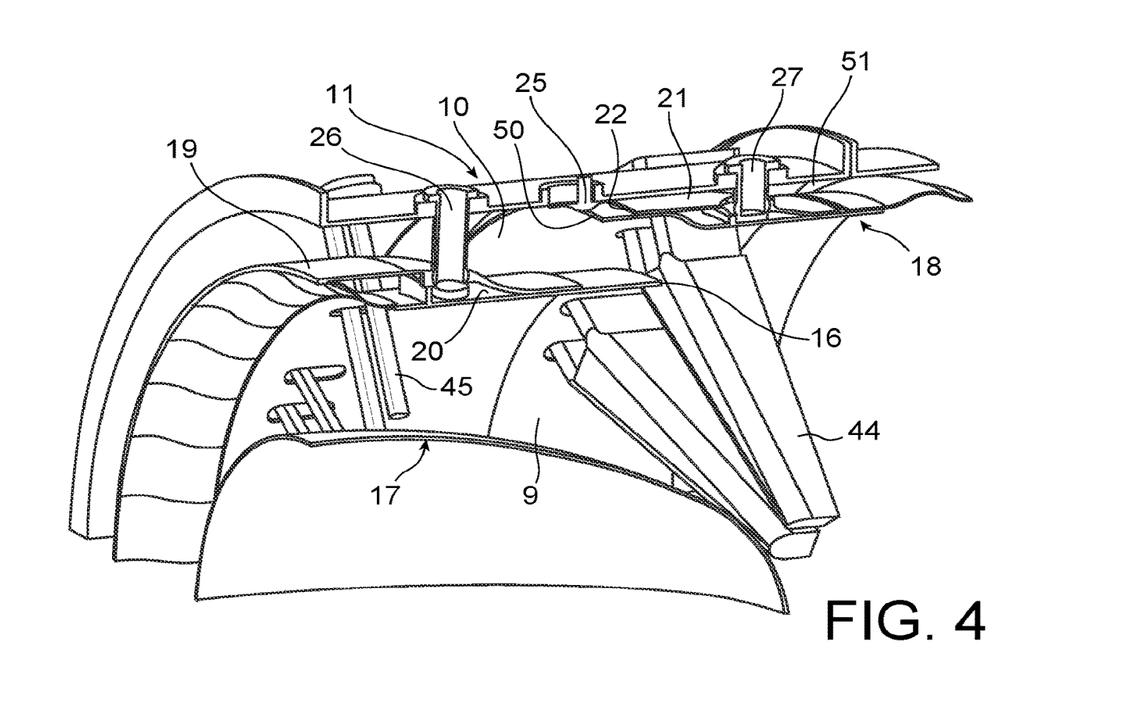
FIG. 4 is another view, in perspective, of the confluence zone.

The more particularly original arrangements of the invention will now be described in relation with FIGS. 3 and 4. The confluence plate 13 is composed of a fixed part 19 and a moving part 20, sliding with respect to the fixed part 19 in the direction of the axis X, and which prolongs it in the downstream direction and comprises the trailing edge 16. The fixed part 19 and the moving part 20 of the confluence plate 13 are both continuous plates. The moving part 20 is at least partially cylindrical. It is more specifically cylindrical at the places where it covers or may cover the fixed part 19 by sliding thereon; it may have a different shape, conical for example, more downstream, in the portions adjacent to the trailing edge 16. The sleeve 56 is prolonged in the upstream direction by a shell 18 constructed in an analogous manner, with a fixed part 21 and a moving part 22, sliding with respect to the preceding in the direction of the axis X, but which prolongs it in the upstream direction and comprises the spout 50. When this arrangement of moving part of the shell 18 is adopted, the outer casing 11 advantageously bears a projection 25 on its inner face, a little upstream of the trailing edge 16, and which corresponds to a slight constriction of the section of the secondary stream 10.

Pins 26 and 27 make it possible to displace respectively the moving part 20 of the confluence plate 13, and the moving part 22 of the shell 18, with respect to the corresponding fixed parts 19 and 21. These pins 26 and 27 traverse the outer casing 11 and each comprise an outer end 28, bearing on a boss 29 of the outer casing 11, a ball joint 30 projecting around them at the place where the pins 26 and 27 traverse the fixed parts 19 and 21, and a cam 31 at their inner end, which bears on the circular edges 32 or 33 of the moving parts 20 and 22. The cams 31 are circular and eccentric with respect to the axis of the pins 26 and 27, which makes it possible to push back the edges 32 and 33, and thus the moving parts 20 and 22, in the axial direction when the pins 26 and 27 are turned round. The control mechanism of the pins 26 and 27 is not represented in detail, but it is not critical for the implementation of the invention and may consist in known devices with control ring surrounding the outer casing 11 and with connecting rods, each of which is hinged to the control ring and to a respective pin 26 or 27: by turning the ring around the outer casing 11 by an engine, the inclination of the connecting rods in the angular direction of the outer casing 11 varies, and the pins 26 and 27 pivot. Such mechanisms are common in the prior art for the application resembling modifying the angular setting of certain stages of fixed blades provided with pivots traversing the outer casing. Other mechanisms could also be proposed: with cable, with rack and pinion, with actuator for example. It will be preferred to be able to control the mechanisms in flight to adjust the confluence conditions at any moment, but the invention could also encompass mechanisms only adjustable on the ground. In an alternative, assemblies of fixed pins, bearing ball joints 30, and pins turning in the preceding and bearing cams 31, could be used.

Figure 5:
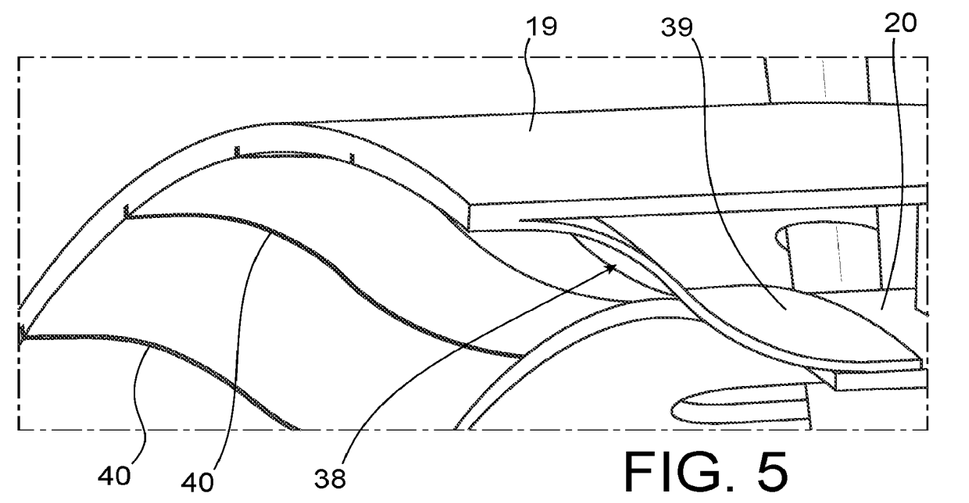
FIG. 5 represents a link between a fixed part and a moving part of the structure.

The pins 26 and 27 are distributed around the turbojet engine in two circular groups. They contribute to maintaining the concentricity of the fixed parts 19 and 21 with the axis of the engine. They enable however their thermal expansion, thanks to the sliding offered by the adjustment of the ball joints 30 in radiating liners 52 of the fixed parts 19 and 21. The fixed parts 19 and 21 and the moving parts 20 and 22 have regions of overlap with important clearances which constitute annular housings 34 and 35, where are housed the ends of the pins 26 and 27, the cams 31 and the edges 32 and 33. The housings 34 and 35 are limited by corrugated portions for connecting the fixed parts 19 and 21 to the moving parts 20 and 22. These portions comprise, for the confluence plate 13, an outer portion 36 belonging to the fixed part 19, traversed by the pins 26 and which finishes downstream on a cylindrical end 37 and adjusted around the moving part 20 with little clearance; and an inner portion 38 fixed to the fixed part 19 at an upstream end and of which a downstream end 39 is cylindrical and slides on the moving part 20 upstream of the pins 26; this inner portion 38 may consist, as represented in FIG. 5, in a plate provided with longitudinal slots 40 that divide it into petals, at the downstream end 39 and the intermediate curved region at the ends, giving it sufficient flexibility so that it rubs without important stress on the moving part 20 and maintains good sealing of the primary stream 9 at the connection between the fixed and moving parts 19 and 20. The fixed part 21 of the shell 18 also comprises a corrugated outer portion 41, traversed by the pins 27 and ending up upstream on a cylindrical end 42, adjusted with little clearance around the moving part 23; and an inner portion 43 is shaped on the moving part 22. These portions 36, 38, 41 and 43 thus comprise in general two cylindrical ends, and a corrugated or curved region connecting the ends without sudden variation in slope, to preserve a good quality of the flow in the primary stream 9 (for the inner portion 38), the secondary stream 10 (for the outer portion 36 and the inner portion 43), or the under sleeve channel 51 (for the outer portion 41).

Radial structural elements may extend through the confluence plate 13 or the shell 18. This is the case here of flame holder arms 44, which traverse the shell 18, and afterburn pencils 45 which traverse the confluence plate 13. If these flame holder arms 44 or these pencils 45 have to traverse the moving part 20 or 22, the latter is provided with oblong piercings 46 or 47 stretching out in the axial direction X to enable it to slide. These oblong piercings 46 or 47 may be covered by sliding or deformable airtight seals to cover their opening and not to allow leaks.

Figure 6:
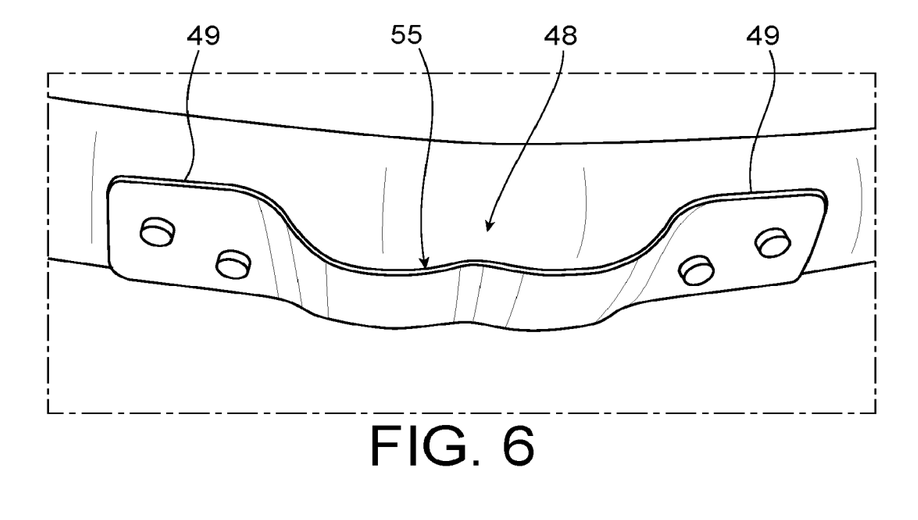
FIG. 6 represents a means for centring between a fixed part and a moving part.

The concentricity of the moving parts 20 or 22 in the fixed parts 19 or 21 may be ensured by springs such as bridge fittings 48 (FIG. 6) of arcuate shape, having ends 49 fixed to one of the parts and a curved median portion 55 bearing on the other part. Such bridge fittings 48 may be mounted notably at the ends 37 and 42 of the fixed parts 19 and 21, tangential to the moving parts 20 and 22 and distant therefrom by little clearance, their median portions 55 then sliding on the moving parts 20 and 22, cylindrical at this place. The concentricity could also be ensured by wheels or rollers, solid lubricant coatings or anti-wear layers.

The annular projection 25 may itself be slidingly mounted in the outer casing 11, by providing it with pins 53 traversing the outer casing 11, which will make it possible to grip them by a control mechanism, and moveable in oblong piercings 54 also hollowed out through the outer casing 11 and stretching out in the direction of the axis X. This arrangement makes it possible to vary more considerably the opening section and the ease of access to the under sleeve channel 51 than with the moving portion 22 alone of the shell 18.

Figure 7:
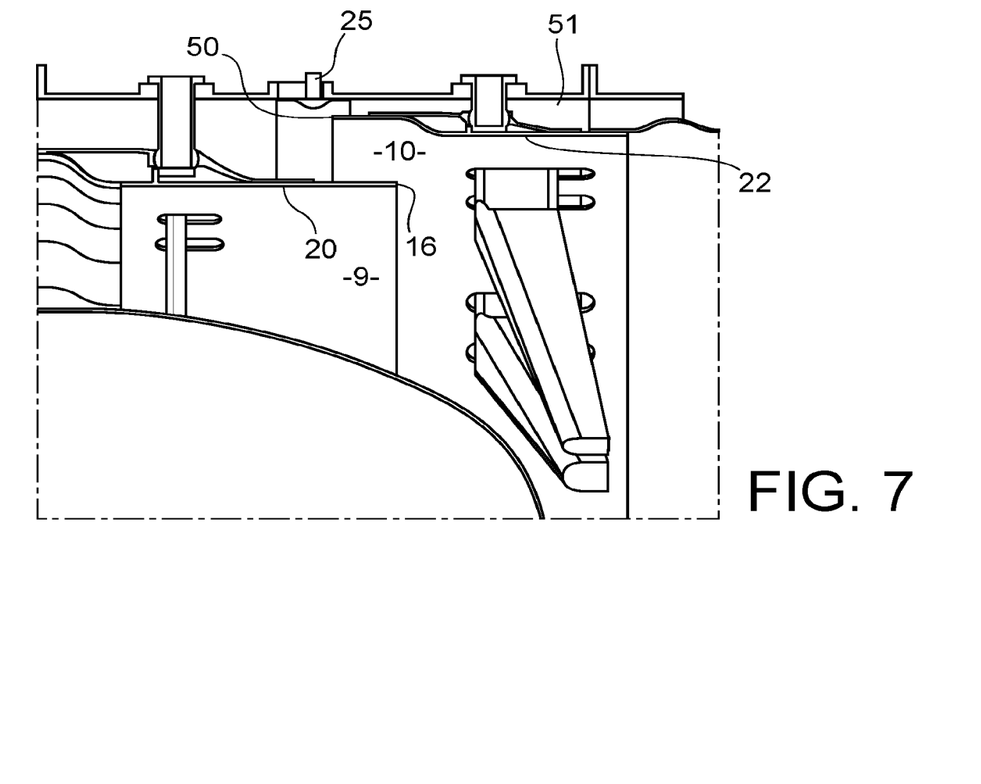
FIG. 7 represents a first state of the device.
Figure 8:
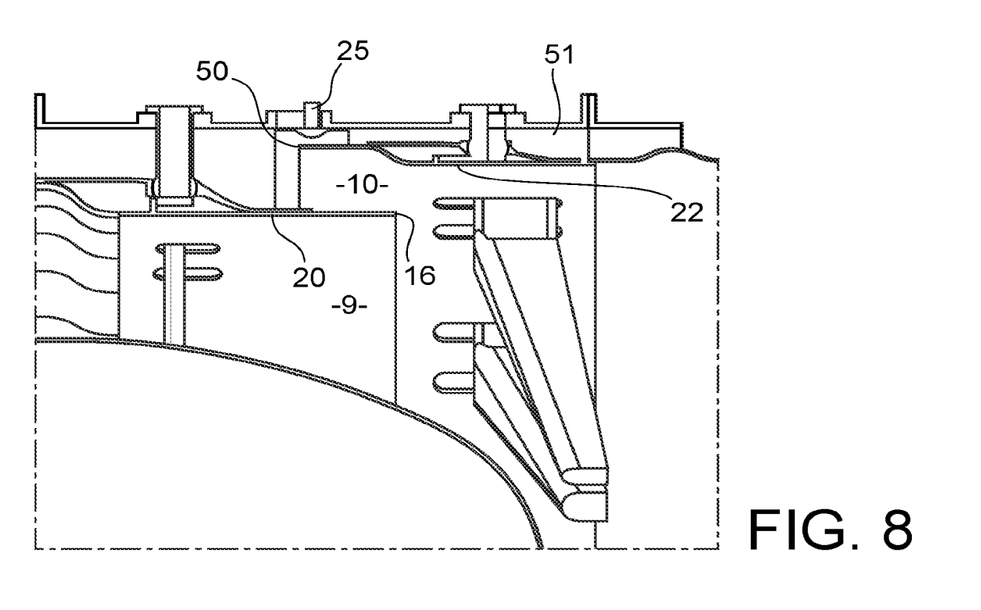
FIG. 8. a second state.
Figure 9:
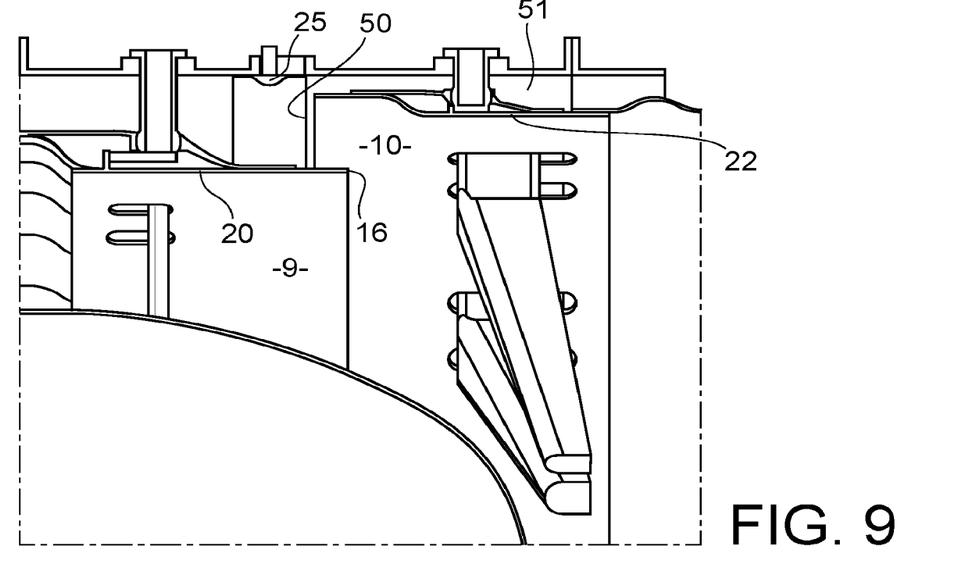
FIG. 9 a third state.

The other FIGS. 7, 8 and 9 illustrate the steps that the device can take. The moving parts 20 and 22 and the projection 25 may all be displaced independently, and the device may furthermore only comprise the moving part 20 equipping the confluence plate 13. By displacing this moving part 20, around the cone 17, it is possible to vary the section of the primary stream 9 at the place of confluence. And by displacing the moving part 22 of the shell 18 and optionally the projection 25, it is possible to place the moving part 22 in front of the projection 25 or to move it away therefrom, so as to impede or on the contrary to favour the passage of air in the under sleeve channel 51 and thus to vary the flow rate of air of the secondary stream 10 which contributes to the dilution on reaching the confluence, even if the moving parts 20 and 22 are both cylindrical.

But the movement of the moving part 22 of the shell 18 acts above all on the confluence, independently of the under sleeve channel 51, by modifying the position of the trailing edge 16 with respect to the curved inner portion 43 of the moving part 22 of the shell 18, that is to say the outlet section of the secondary stream 10 at the confluence when the curved part 43 slides around the trailing edge 16.

It is thus possible to act on the sections of the primary 9 and secondary 10 streams at the confluence, and the under sleeve channel 51 at its inlet, thus on the gas pressures at the confluence, the flow rate of the secondary stream 10 at the confluence, and the temperature of the gases. This implies that it is possible to adjust the thrust of the engine—which depends above all on the temperature of the gases—and the fuel consumption—which depends a lot on the extraction ratio, that is to say on the pressure ratio of the streams. The invention does not imply that afterburn is present. The projection 25 is optional, and the sleeve 56 may be completely fixed, or even absent, while accepting to benefit from the advantages of the invention to a lesser degree.

FIG. 7 thus illustrates a state where the moving part 20 of the confluence plate 13, the moving part 22 of the shell 18 and the projection 25 are pushed back in the downstream direction. The curved inner portion 43 is downstream of the trailing edge 16, and the under sleeve channel 51 is moderately open. The sections of the primary 9 and secondary 10 streams are important at the confluence, and the flow rate passing through the under sleeve channel 51 is moderated.

FIG. 8 differs from FIG. 7 in that the moving part 22 of the shell 18 is pushed back in the upstream direction. This makes it possible to obstruct much more considerably the under sleeve channel 51, which increases the flow rate of the secondary stream 10 which contributes to the dilution. And the curved part is then upstream of the trailing edge 16, which reduces the section of the secondary stream 10.

FIG. 9 illustrates a state where the moving part 20 of the confluence plate 13 is pushed back in the upstream direction, and the moving part 22 of the shell 18 is pushed back in the downstream direction, and the projection 25 in the upstream direction, which reduces the section of the primary stream 9 and opens as much as possible the under sleeve channel 51, by thus reducing the flow rate of the secondary stream 10 which contributes to the dilution, the curved inner portion 43 then being downstream of the trailing edge 16. The states of FIGS. 8 and 9 are thus states opposite to dilution.

Intermediate states may also be envisaged.

Figure 10:
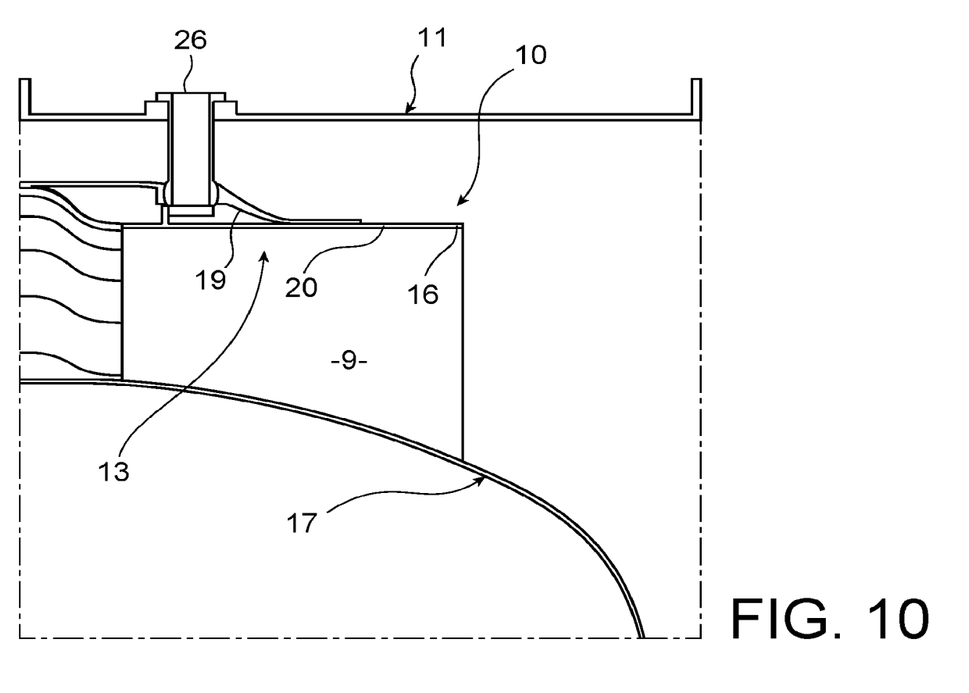
FIG. 10 illustrates another embodiment, more general, of the invention.

FIG. 10 illustrates another important embodiment of the invention, conforming to the preceding remarks: the afterburn pencils 45, the flame holder arms 44, the sleeve 56 and the projection 25 are absent, as well as the means for controlling the position of the latter and the moving part 22 of the shell 18. The remainder of the device is unchanged, if it is not that the outer casing 11 is smooth and continuous downstream of the pins 26 and that the confluence plate 13 is exempt of oblong piercings 47. The control of the dilution is done only by the pins 26, to modify the section of the primary stream 9 at the confluence, the section of the secondary stream 10 being unchanged with a cylindrical outer casing 19. The advantageous characteristics of the invention, set out with regard to the preceding figures, are found in this embodiment of the invention, which has furthermore an importance at least as great as the preceding since it corresponds to the more general and more frequent situation where afterburning is not required.

The invention claimed is:

1. A confluence structure of a primary stream and a secondary stream, surrounding the primary stream, of an aircraft engine, the confluence structure comprising:
   a confluence plate separating the primary stream and the secondary stream downstream of a low pressure turbine and having a revolution shape and a downstream end, according to a direction of flow of gas in the primary stream and the secondary stream in an axial direction of the engine, the primary stream containing blades of compressors and turbines, and a combustion chamber, the secondary stream being limited externally, in a radial direction of the engine, by an outer casing,
   wherein the confluence plate has a moving part, adjustably sliding in the axial direction with respect to a complementary part, fixed with respect to the outer casing, of said confluence plate, the moving part comprising the downstream end, the primary stream and the secondary stream joining together only downstream of said downstream end, and
   wherein a shell is mounted in the outer casing while delimiting an annular outer channel therewith, the shell extending notably downstream of the downstream end of the confluence plate and having an upstream end, according to said direction of flow of gases, wherein the shell has a moving part, comprising the upstream end and adjustably sliding in the axial direction with respect to a complementary part, fixed with respect to the outer casing, of said shell.

2. The confluence structure according to claim 1, wherein the outer casing comprises a projection projecting radially inwards in the secondary stream, and the moving part of the shell is moveable in positions where the upstream end is upstream of the projection, and in positions where the upstream end is downstream of the projection.

3. The confluence structure according to claim 2, wherein the projection is moveable in the outer casing in the direction of the axis, due to an adjustment mechanism comprising pins traversing the outer casing and sliding in slots traversing the outer casing.

4. The confluence structure according to claim 1, wherein at least one of the complementary and moving parts of the confluence plate or of the shell comprises a curved portion of variation in radius without sudden slope variation.

5. The confluence structure according to claim 4, wherein said curved portion belongs to the shell, and the downstream end is moveable in front of the curved part and surrounded by the curved part.

6. The confluence structure according to claim 5, wherein the curved portion belongs to the moving part of the shell.

7. The confluence structure according to claim 4, wherein said curved portion connects the complementary part to the moving part of the confluence plate, is integral with one of said parts and joins to the other of said parts by a cylindrical portion sliding on said other part, the curved portion and the cylindrical portion being divided into angular sectors by slots stretching out in the direction of the axis.

8. The confluence structure according to claim 1, wherein at least one of the moving part of the confluence plate and the moving part of the shell is traversed by radial extension elements of the structure, through oblong piercings covered with airtight seals.

9. The confluence structure according to claim 8, wherein said elements comprise afterburn fuel injector pencils or flame holder arms.

10. The confluence structure according to claim 1, wherein one at least of the moving part of the confluence plate and the moving part of the shell is displaced by adjustment devices extending outside of the outer casing.

11. The confluence structure according to claim 10, wherein the adjustment devices are pivoting pins radially bearing on the outer casing and provided with cams bearing on the edges of the moving parts.

12. The confluence structure according to claim 11, wherein the pivoting pins traverse liners of one at least of the complementary part of the confluence plate and the complementary part of the shell, while being centred centered thereon by ball joints projecting arounds pins.

13. The confluence structure according to claim 1, wherein the moving part is connected to the complementary part, for at least one of the confluence plate and the shell, by springs compressed in the radial direction.

14. The confluence structure according to claim 1, wherein the moving part of the confluence plate is cylindrical at least at a portion of overlap of the complementary part.

15. A bypass turbine engine equipped with the confluence structure according to claim 1.

* * * * *